United States Patent
Youn et al.

(10) Patent No.: US 9,166,680 B2
(45) Date of Patent: Oct. 20, 2015

(54) APPARATUS AND METHOD FOR MEASURING IQ IMBALANCE FOR OPTICAL RECEIVER

(71) Applicant: Electronics and Telecommunications Research Institute, Daejeon (KR)

(72) Inventors: Chun Ju Youn, Daejeon (KR); Jong-Hoi Kim, Daejeon (KR); Joong-Seon Choe, Daejeon (KR); Duk Jun Kim, Daejeon (KR); Yong-Hwan Kwon, Daejeon (KR); Eun Soo Nam, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 45 days.

(21) Appl. No.: 14/027,445

(22) Filed: Sep. 16, 2013

(65) Prior Publication Data

US 2014/0169786 A1    Jun. 19, 2014

(30) Foreign Application Priority Data

Dec. 14, 2012  (KR) .......................... 10-2012-0146841

(51) Int. Cl.
| | |
|---|---|
| *H04B 10/073* | (2013.01) |
| *H04B 10/61* | (2013.01) |
| *H04L 27/22* | (2006.01) |
| *H04L 27/36* | (2006.01) |
| *H04L 27/00* | (2006.01) |

(52) U.S. Cl.
CPC .......... *H04B 10/0731* (2013.01); *H04B 10/613* (2013.01); *H04L 27/223* (2013.01); *H04L 27/364* (2013.01); *H04L 2027/0083* (2013.01)

(58) Field of Classification Search
CPC .................................................. H04B 10/0775
USPC ........................................................... 398/25
See application file for complete search history.

(56) References Cited

U.S. PATENT DOCUMENTS

| | | | | |
|---|---|---|---|---|
| 5,317,382 A | * | 5/1994 | Miyazaki et al. ............. | 356/491 |
| 8,223,340 B2 | * | 7/2012 | Digonnet et al. ............. | 356/460 |

(Continued)

FOREIGN PATENT DOCUMENTS

| | | |
|---|---|---|
| JP | 2012-114599 A | 6/2012 |
| KR | 10-2011-0033286 A | 3/2011 |

OTHER PUBLICATIONS

Abdullah Al Amin, et al., "A hybrid IQ imbalance compensation method for optical OFDM transmission", Optics Express, vol. 18, No. 5, pp. 4859-4866, Mar. 2010.

*Primary Examiner* — David Payne
*Assistant Examiner* — Omar S Ismail
(74) *Attorney, Agent, or Firm* — Rabin & Berdo, P.C.

(57) ABSTRACT

Provided is an apparatus and method for measuring IQ imbalance, and in particular, is an apparatus and method for measuring IQ imbalance for an optical receiver. The apparatus for measuring IQ imbalance for an optical receiver includes a light generating unit generating optical and reference signals to provide the optical and reference signals to an optical receiver, a graph creating unit creating a Lissajous figure by using an in-phase (I) signal and a quadrature-phase (Q) signal output from the optical receiver in response to the optical and reference signals, and a calculating unit calculating IQ imbalance for the optical receiver with reference to the Lissajous figure.

14 Claims, 8 Drawing Sheets

(56) References Cited

U.S. PATENT DOCUMENTS

2008/0212662 A1* 9/2008 Lee et al. ............... 375/224
2008/0232808 A1* 9/2008 Watanabe ............... 398/92
2009/0119043 A1* 5/2009 Tao et al. ............... 702/66
2011/0182589 A1* 7/2011 Kotake et al. ........... 398/152
2011/0249981 A1   10/2011 Deczky et al.
2012/0057863 A1*  3/2012 Winzer et al. ........... 398/3
2012/0141067 A1*  6/2012 Sakamaki et al. ........ 385/31
2012/0177383 A1*  7/2012 Tanimura et al. ........ 398/158
2012/0308227 A1* 12/2012 Komaki et al. .......... 398/25

* cited by examiner

APPARATUS AND METHOD FOR MEASURING IQ IMBALANCE FOR OPTICAL RECEIVER

CROSS-REFERENCE TO RELATED APPLICATIONS

This U.S. non-provisional patent application claims priority under 35 U.S.C. §119 of Korean Patent Application No. 10-2012-0146841, filed on Dec. 14, 2012, the entire contents of which are hereby incorporated by reference.

BACKGROUND OF THE INVENTION

The present invention disclosed herein relates to an apparatus and method for measuring IQ imbalance, and more particularly, to an apparatus and method for measuring IQ imbalance for an optical receiver.

As a receiver in a high speed transmission system using an optical signal, a coherent optical receiver is being researched. The coherent optical receiver outputs an in-phase (I) signal and a quadri-phase (Q) signal. In a non-ideal optical receiver, amplitude imbalance and phase imbalance may occur between the output I-signal and Q-signal. Since these IQ imbalances distort an original signal, a signal receiving performance of the optical receiver may be lowered.

The lowered performance of the optical receiver may be prevented by measuring IQ imbalances thereof and compensating for a signal on the basis of the measured IQ imbalances in an optical transmitter and the optical receiver. In order to measure the IQ imbalances digitally, a plurality of signal samples may be used. However, in order to estimate the IQ imbalances digitally, a lot of signal samples may be required and accordingly a lot of calculations may be required for a high speed signal.

SUMMARY OF THE INVENTION

The present invention provides an apparatus and method for measuring IQ balance capable of measuring IQ balance in an optical receiver with a few calculations for a low speed signal.

Embodiments of the present invention provide apparatuses for measuring IQ imbalance, the apparatuses including: a light generating unit generating optical and reference signals to provide the optical and reference signals to an optical receiver; a graph creating unit creating a Lissajous figure by using an in-phase (I) signal and a quadrature-phase (Q) signal output from the optical receiver in response to the optical and reference signals; and a calculating unit calculating IQ imbalance for the optical receiver with reference to the Lissajous figure.

In some embodiments, the optical and reference signals may have the same frequency.

In other embodiments, a phase of the optical signal may be variable.

In still other embodiments, the light generating unit may include: a light source generating a reference optical signal; an optical splitter splitting the reference optical signal into first and second optical signals and outputting the second optical signal as the reference signal; an optical phase modulator modulating a phase of the first optical signal in response to a control voltage, and outputting the modulated first optical signal as the optical signal; and a function generator controlling the optical phase modulator by using the control voltage.

In even other embodiments, the light generating unit may further include a polarization adjustor adjusting polarization of the first optical signal so as to allow the same polarization states of the optical and reference signals to be same.

In yet other embodiments, the function generator may control the optical phase modulator to change a phase of the first optical signal by $2\pi$.

In further embodiments, the control voltage may be varied linearly from a ground voltage to a threshold phase voltage level.

In still further embodiments, the calculating unit may calculate the IQ imbalance of the optical receiver with reference to the Lissajous figure by using an elliptic equation.

In even further embodiments, a frequency of the reference signal may be variable.

In yet further embodiments, a frequency difference between the reference and optical signals may have a value of a pre-designated threshold value or smaller.

In still much further embodiments, the pre-designated threshold value may be set on the basis of a bandwidth of the optical receiver.

In still even much further embodiments, the light generating unit may include: a first light source generating the optical signal; a second light source generating the reference signal; a wavelength controller controlling the second light source to vary a frequency of the reference signal; and a polarization adjustor adjusting polarization of the optical signal so as to allow the same polarization states of the optical and reference signals to be the same.

In other embodiments of the present invention, methods of measuring IQ imbalance for an optical receiver includes: providing an optical having a variable phase and a reference signal to the optical receiver; creating a Lissajous figure on the basis of I and Q signals output from the optical receiver in response to the optical and reference signals; and calculating the IQ imbalance for the optical receiver by using a preset equation of a figure with reference to the Lissajous figure.

In some embodiments, the reference signal may have the same frequency as the optical signal, and the calculating of the IQ imbalance may include calculating the IQ imbalance for the optical receiver by using an elliptic equation with reference to the Lissajous figure.

In still other embodiments of the present invention, methods of measuring IQ imbalance for a coherent optical receiver includes: providing an optical signal and a reference signal having a variable frequency to the coherent optical receiver; creating a Lissajous figure on the basis of I and Q signals output from the coherent optical receiver in response to the optical and reference signals; and calculating IQ imbalance for the coherent optical receiver with reference to the Lissajous figure, wherein a frequency difference between the reference and optical signals has a value of a pre-designated threshold value or smaller.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
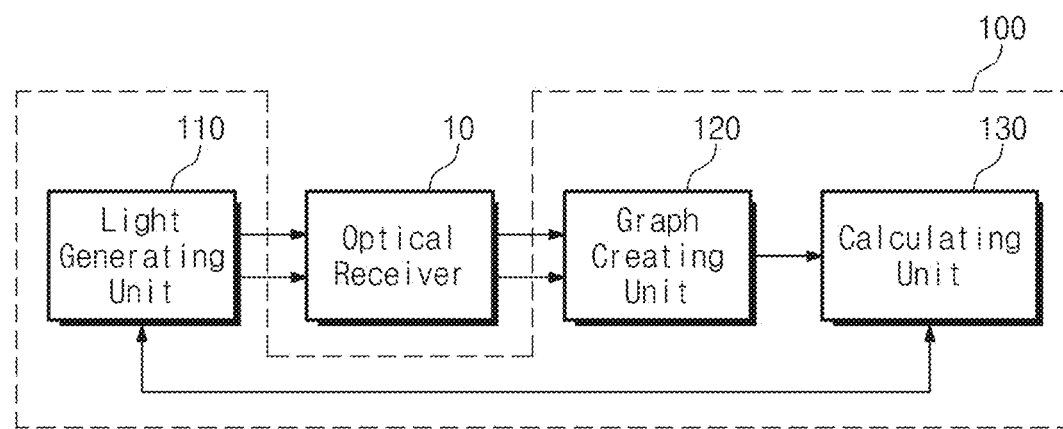
FIG. 1 is a block diagram illustrating an apparatus for measuring IQ imbalance according to the present invention and an optical receiver connected thereto.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the present invention in conjunction with the accompanying drawings. Like reference numerals refer to like elements throughout.

FIG. 1 is a block diagram illustrating an apparatus for measuring IQ imbalance according to the present invention and an optical receiver 10 connected thereto. Referring to FIG. 1, the apparatus 100 for measuring IQ imbalance includes a light generating unit 110, a graph creating unit 120 and a calculating unit 130. The apparatus 100 for measuring IQ imbalance may measure IQ imbalance by using a Lissajous figure for an in-phase (I) signal and a quadri-phase (Q) signal output from the optical receiver 10 in response to an optical signal and a reference signal. The apparatus 100 for measuring IQ imbalance can measure IQ imbalance for the optical receiver 10 with a few calculations for a low speed signal by using a Lissajous figure.

The light generating unit 110 generates an optical signal and a reference signal to be provided to the optical receiver 10. The phases of the optical and reference signals generated by the light generating unit 110 may be adjusted.

The optical and reference signals generated by the light generating unit 110 may be respectively phase-modulated and continuous-wave signal. The light generating unit 110 provides the generated optical and reference signals to the optical receiver 10.

The optical receiver 10 may be a coherent optical receiver. The optical receiver 10 outputs first and second light detecting signal groups in response to the input optical and reference signals. The first light detecting signal group output from the optical receiver 10 is output in response to first polarization components of the optical and reference signals. The second light detecting signal group output from the optical receiver 10 is output in response to second optical polarization components of the optical and reference signals. Hereinafter, the optical receiver 10 and the first and second light detecting signal groups output therefrom will be described in detail with reference to FIG. 2.

The graph creating unit 120 may receive the first light detecting signal group output from the optical receiver 10. Alternatively, the graph creating unit 120 may receive the second light detecting signal group output from the optical receiver 10. The graph creating unit 120 creates a Lissajous figure by using the first light detecting signal group, the second light detecting signal group, and the first and second light detecting signal groups. Methods of creating Lissajous figures for the first light detecting signal group and the second light detecting signal group are the same. Therefore, only the method of creating a Lissajous figure for the first light detecting signal group will be described below.

The first light detecting signal group include a first I signal group and a first Q signal group. The first I signal group is output in response to I (In-phase) components of the first polarization components of the optical and reference signals. The first Q signal group is output in response to Q (Quadrature-phase) components of the first polarization components of the optical and reference signals.

The graph creating unit 120 selects the I signal from the first I signal group and the Q signal from the first Q signal group. The graph creating unit 120 creates a Lissajous figure by using the I and Q signals. For example, the graph creating unit 120 may create a Lissajous figure by taking X-axis as the I signal and Y-axis as the Q signal. The graph creating unit 120 provides the created Lissajous figure to the calculating unit 130. The graph creating unit 120 may be an oscilloscope. However, the configuration of the graph creating unit 120 is not limited thereto.

The calculating unit 130 calculates IQ imbalance by using the Lissajous figure. The calculating unit 30 compares the created Lissajous figure and an ideal Lissajous figure expected from the optical and reference signals generated by the light generating unit 110. The calculating unit 130 may analyze the comparison result to calculate IQ imbalance of the optical receiver 10.

A Lissajous figure may be created for a low speed signal. Also, by using a simple shaped Lissajous figure, for example, a circle, the IQ imbalance may be easily calculated even with a few calculations. Operations of the light generating unit 110 and the calculating unit 130 will be described in detail later with reference to FIGS. 3 to 5.

The above described apparatus 100 for measuring IQ imbalance may generate an optical signal and a reference signal, create a Lissajous figure on the basis of an I signal and a Q signal output from the optical receiver 10 in response to the created optical and reference signals, and measure IQ imbalance of the optical receiver by using the created Lissajous figure. Since the apparatus for measuring IQ 100 imbalance uses a Lissajous figure, the IQ imbalance for the optical receiver can be measured with a few calculations for a low speed signal. In addition, the apparatus 100 for measuring IQ imbalance can vary frequencies and phases of the optical and reference signals to measure the IQ imbalance for the optical receiver in various signal environments.

Figure 2:
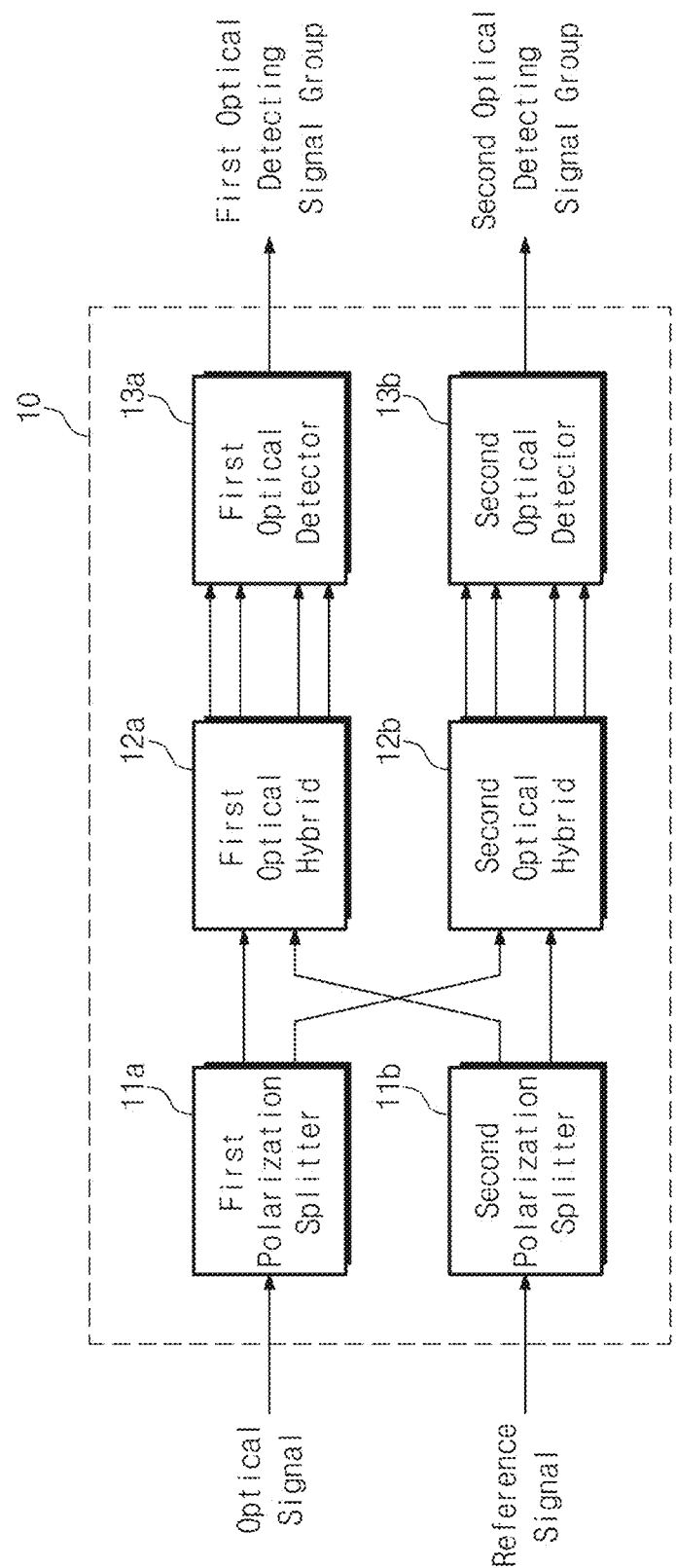
FIG. 2 is a block diagram illustrating an embodiment of the optical receiver in FIG. 1.

FIG. 2 is a block diagram illustrating an embodiment of the optical receiver in FIG. 1. Referring to FIG. 2, the optical receiver 10 includes first and second polarization splitters 11a and 11b, first and second optical hybrids 12a and 12b, and first and second optical detectors 13a and 13b. The optical receiver 10 may be a coherent optical receiver. The optical receiver 10 outputs first and second light detecting signal groups in response to an optical signal and a reference signal.

The first polarization splitter 11a receives an optical signal. The first polarization splitter 11a splits the received optical signal into first and second polarization components. The first polarization splitter 11a provides the first polarization component of the optical signal to the first optical hybrid 12a, and the second polarization component of the optical signal to the second optical hybrid 12b.

The first and second polarization splitter 11a and 11b may split a signal provided by using, for example, an optical splitter, a birefringent waveguide, and a phase-shift waveguide into the first and second polarization components. However, the configuration of the first and second polarization splitter 11a and 11b is not limited thereto.

The first optical hybrid 12a detects the first polarization component of the optical signal by using the first polarization component of the reference signal. An output of the first optical hybrid 12a is transferred to the first optical detector 13a. The output of the first optical hybrid 12a may be a plurality of interference signals that a phase difference between the first polarization component of the reference signal and the first polarization component of the optical signal increases in a step of a constant value, for example, $\pi/2$.

The second optical hybrid 12b detects the second polarization component of the optical signal by using the second polarization component of the reference signal. An output of the second optical hybrid 12b is transferred to the second optical detector 13b. The output of the second optical hybrid 12b may be a plurality of interference signals that a phase difference between the second polarization component of the reference signal and the second polarization component of the optical signal increases in a step of a constant value, for example, $\pi/2$.

The first optical detector 13a receives the output from the first optical hybrid 12a and generates an electrical signal, for example, a current or a voltage, corresponding to an intensity of the received light.

The first optical detector 13a outputs, in response to the output from the first optical hybrid 12a, a first I signal group corresponding to I components of the first polarization components of the optical and reference signals. The first optical detector 13a, in response to the output from the first optical hybrid 12a, outputs a first Q signal group corresponding to Q components of the first polarization components of the optical and reference signals. The first I and Q signal groups generated by the first optical detector 13a are output as a first optical detecting signal group.

The second optical detector 13b receives the output from the second optical hybrid 12b and generates an electrical signal, for example, a current or a voltage, corresponding to an intensity of the received light.

The second optical detector 12b outputs, in response to the output from the second optical hybrid 12b, a second I signal group corresponding to I components of the first polarization components of the optical and reference signals. The second optical detector 13b, in response to the output from the second optical hybrid 12b, outputs a second Q signal group corresponding to Q components of the second polarization components of the optical and reference signals. The second I and Q signal groups generated by the second optical detector 13b are output as a second optical detecting signal group.

The first and second I signal groups include I signals of the first and second polarization components of the optical and reference signals. The first and second Q signal groups include Q signals of the first and second polarization components of the optical and reference signals.

As described above, magnitude and phase imbalances may occur between I and Q signals due to physical characteristics of an optical receiver. In order to compensate for these IQ imbalances, the apparatus 100 for measuring IQ imbalance in FIG. 1 provides a method of measuring IQ imbalance.

The apparatus 100 for measuring IQ imbalance may generate optical and reference signals input to the optical receiver 10, create a Lissajous figure on the basis of I and Q signals output from the optical receiver 10 in response to the generated optical and reference signals, and measure IQ imbalance for the optical receiver by using the created Lissajous figure. The apparatus 100 for measuring IQ imbalance can measure the IQ imbalance for the optical receiver with a few calculations for a low speed signal by using the Lissajous figure. Furthermore, the apparatus 100 for measuring IQ imbalance can vary frequencies and phases of the optical and reference signals to measure IQ imbalance for the optical receiver in various signal environments.

Figure 3:
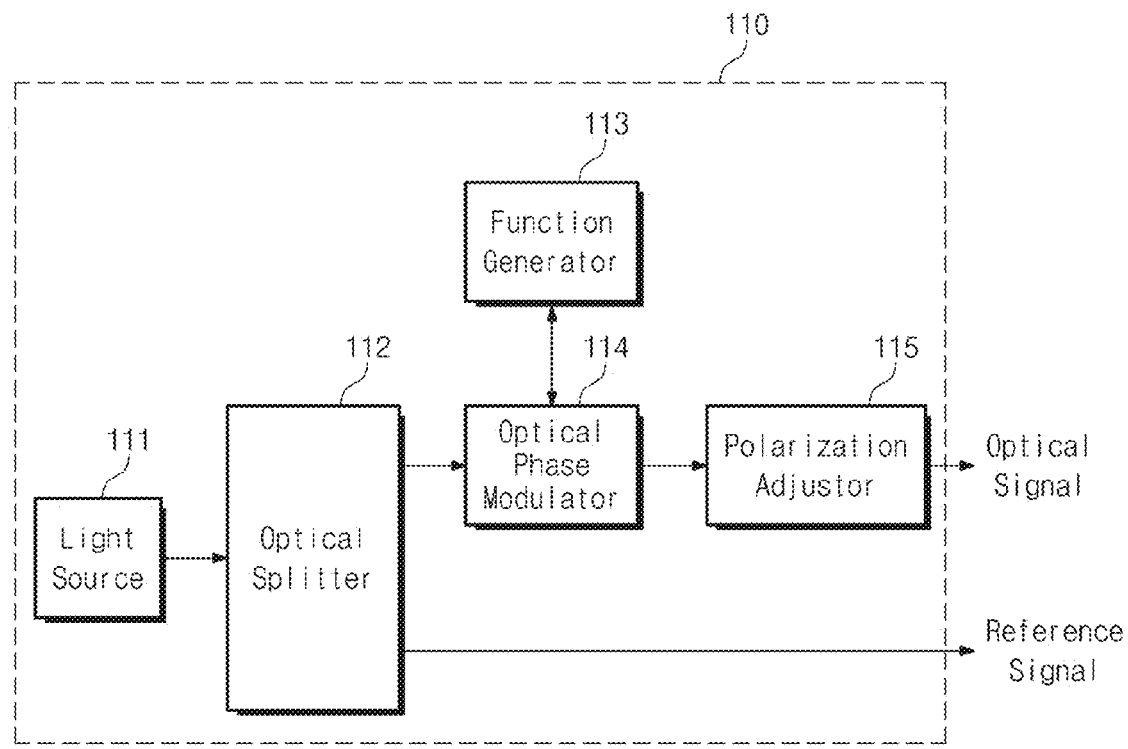
FIG. 3 is a block diagram illustrating an embodiment of the light generating unit in FIG. 1.

FIG. 3 is a block diagram illustrating a light generating unit 110 in FIG. 1. Referring FIG. 3, the light generating unit 110 includes a light source 111, an optical splitter 112, a function generator 113, an optical phase modulator 114, and a polarization adjustor 115. The light generating unit 110 provides an optical signal whose phase is variable and a reference signal having the same frequency as that of the optical signal. An ideal Lissajous figure for an I signal and a Q signal output from the optical receiver 10 in FIG. 1 is a circle in response to the optical and reference signals provided from the light generating unit 110. Accordingly, by using the optical and reference signals generated by the light generating unit 110, the IQ imbalance for the optical receiver may be easily measured through an elliptic equation.

The light source 111 generates a reference optical signal. The light source 111 provides the generated reference optical signal to the optical splitter 112.

The optical splitter 112 splits the optical signal provided from the light source 111 into first and second optical signals. The optical splitter 112 provides the first optical signal to the optical phase modulator 114, and the second optical signal as a reference signal.

The function generator 113 generates a control voltage for controlling the optical phase modulator 114. The control voltage generated from the function generator 113 may be provided to the optical phase modulator 114 for changing a phase of the first optical signal by $2\pi$ or more. The control voltage generated from the function generator 113 may be varied linearly. However, the method of varying the control voltage is not limited thereto.

Figure 4:
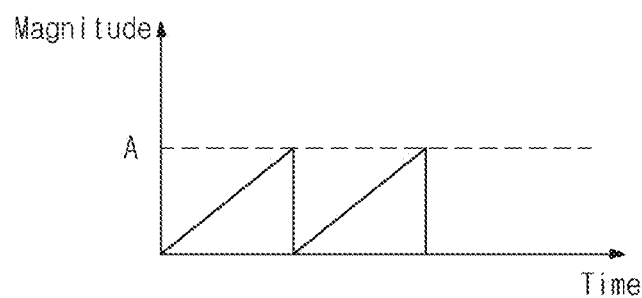
FIG. 4 is a graph illustrating an embodiment of a control voltage generated by a function generator.

FIG. 4 is a graph illustrating the control voltage generated by the function generator 113 in FIG. 3. In FIG. 4, a horizontal axis denotes a time, and a vertical axis denotes a magnitude of the control voltage.

Referring to FIG. 4, the control voltage increases linearly from a ground voltage level to a voltage level A. The voltage level A has a value of a threshold phase voltage level or greater. The threshold phase voltage level is a voltage level enabling the optical phase modulator 114 in FIG. 3 to change the phase of the first optical signal by $2\pi$.

Referring to FIG. 3 again, the optical phase modulator 114 modulates the phase of the first optical signal in response to a control voltage provided from the function generator 113. The optical phase modulator 114 provides the modulated first optical signal to the polarization adjustor 115.

The polarization adjustor 115 adjusts polarization of the modulated first optical signal provided from the optical phase modulator 114. The polarization adjustor 115 may adjust the polarization of the first optical signal so as to be the same as a polarization state of the reference signal. The polarization adjustor 115 outputs the adjusted first optical signal as an optical signal.

The light generating unit 110 outputs an optical signal whose phase is modulated and a reference signal having the same frequency as the optical signal. It is an ellipse that is created as a Lissajous figure by using the I and Q signals output from the optical receiver 10 in FIG. 1 in response to the optical and reference signals output from the light generating unit 110.

When the created Lissajous figure is analyzed by using an elliptic equation, a magnitude of an I component, a magnitude of a Q component and a phase difference between the I and Q components may be calculated. The IQ imbalance for an optical receiver may be calculated by using the calculated information.

Figure 5:
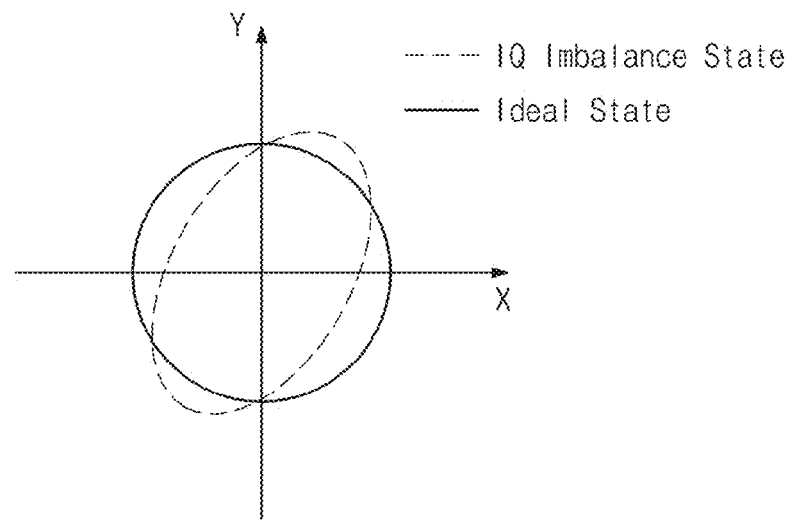
FIG. 5 is a graph illustrating a Lissajous figure created by using an I signal and a Q signal output from the optical receiver in response to an optical signal and a reference signal generated by a light generator in FIG. 3.

FIG. 5 is a graph illustrating a Lissajous figure created by using the I and Q signals output from the optical receiver in response to the optical signal and the reference signal generated by the light generating unit in FIG. 3. In FIG. 5, a horizontal axis denotes the I component and a vertical axis denotes the Q component.

When there are no imbalance in magnitudes of and in a phase difference between the I and Q components of the first optical signal, an ideal Lissajous figure is a circle. However, when IQ imbalance occurs due to physical characteristics of the optical receiver 10 in FIG. 1, the Lissajous figure may be an ellipse. When the Lissajous figure of an ellipse is analyzed by using an elliptic equation, magnitudes of the I component and the Q component, and a phase difference between the I and Q components may be calculated. The IQ imbalance for the optical receiver 10 in FIG. 1 may be calculated by using the calculated information.

Figure 6:
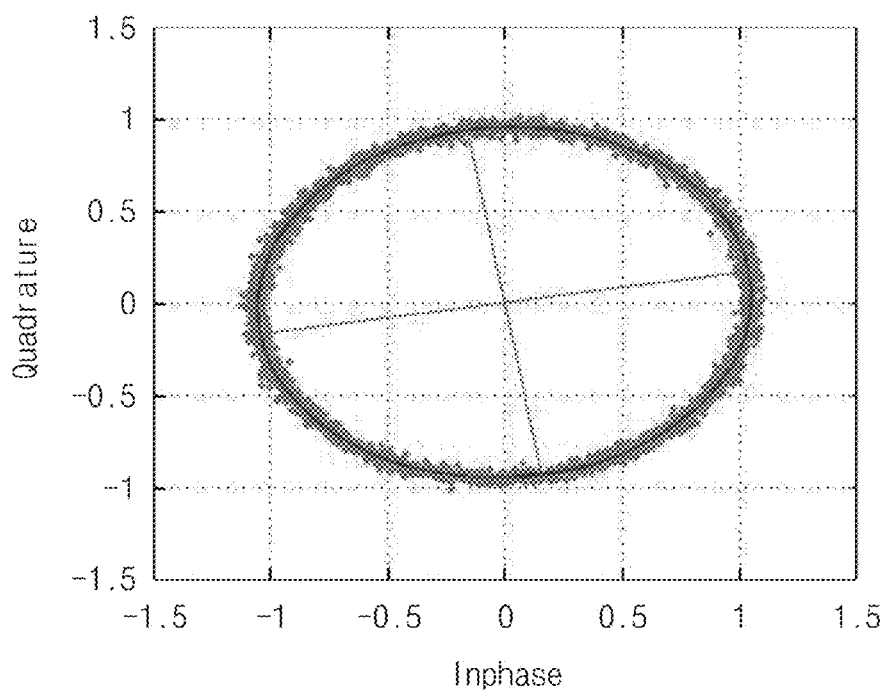
FIG. 6 is a graph illustrating the Lissajous figure in FIG. 5 created by an actual experiment using the apparatus for measuring IQ imbalance in FIG. 1.
Figure 7:
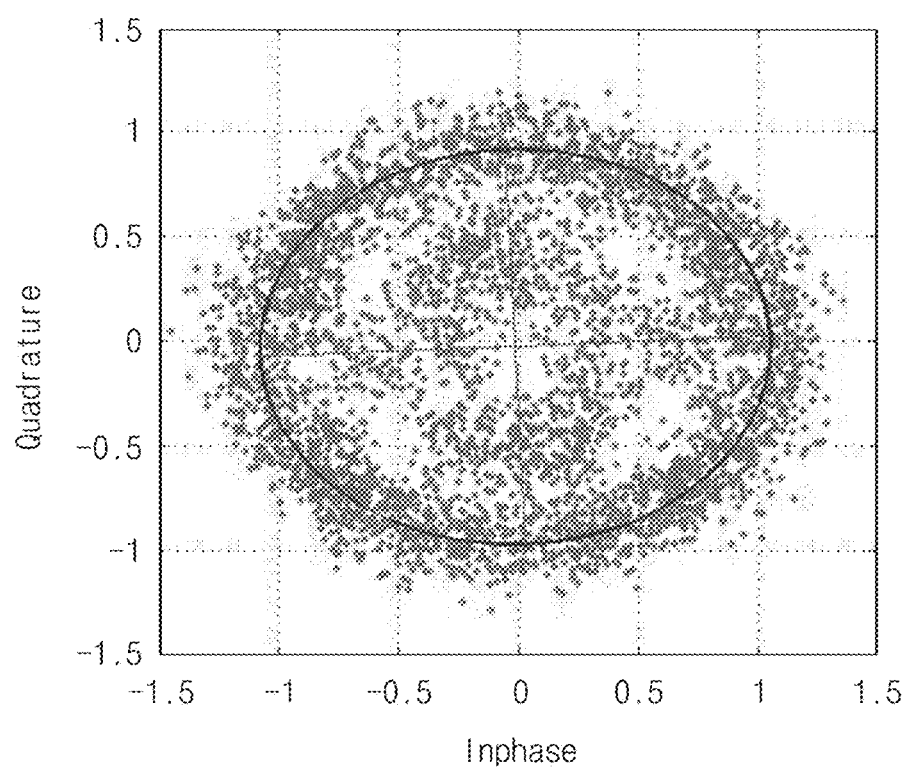
FIG. 7 is a graph illustrating a Lissajous figure created by sampling an I signal and a Q signal output from the optical receiver in response to quadrature phase-shift keying (QPSK) data transmitted in a high speed.

FIG. 6 is a graph illustrating the Lissajous figure in FIG. 5 output from an actual experiment by using the apparatus for measuring IQ imbalance in FIG. 1. FIG. 7 is a graph illustrating a Lissajous figure created by sampling the I and Q signals output by the optical receiver in response to Quadrature phase-shift keying (QPSK) data transmitted in a high speed.

Referring to FIGS. 6 and 7, it may be confirmed that a Lissajous figure created by using the apparatus 100 for measuring IQ imbalance in FIG. 1 is similar to a Lissajous figure created by using an actual data transmitted in a high speed. Accordingly, when the measured IQ imbalance may be corrected with reference to the Lissajous figure created by the apparatus for measuring IQ imbalance, the performance of an actual transmission system can be improved.

Figure 8:
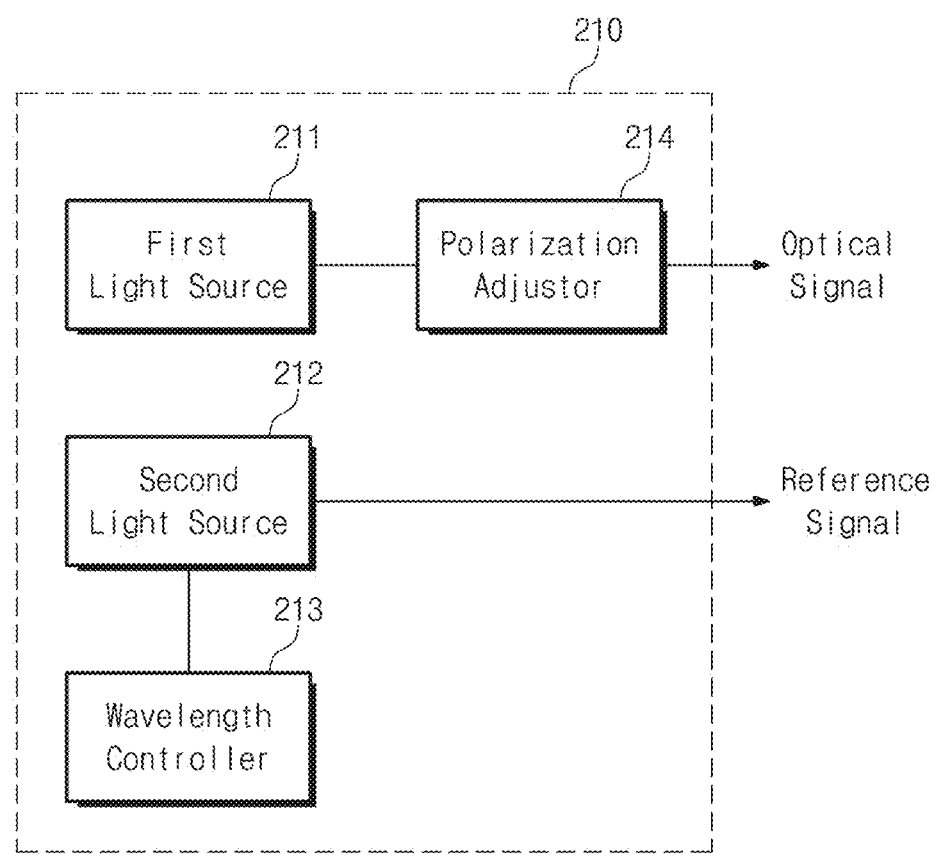
FIG. 8 is a block diagram illustrating other embodiments of the light generator in FIG. 1.

FIG. 8 is a block diagram illustrating another embodiment of the light generating unit in FIG. 1. Referring to FIG. 8, the light generating unit 210 includes a first light source 211, a second light source 212, a wavelength controller 213 and a polarization adjustor 214. The light generating unit 210 outputs an optical signal and a reference signal whose wavelength is variable. IQ imbalance for the optical receiver may be created with reference to a Lissajous figure created by using I and Q signals output from the optical signal 10 in FIG. 1 in response the optical and reference signals output from the light generating unit 210.

The first light source 211 generates a first optical signal. The first light source 211 provides the generated first optical signal to a polarization adjustor 214.

The second light source 212 generates a second optical signal. A frequency of the second optical signal may be varied in response to a control signal provided from the wavelength controller 213. The second light source 212 outputs the second optical signal as the reference signal.

The wavelength controller 213 generates a control signal for controlling the second light source 212. The wavelength controller 213 generates the control signal in order for a frequency difference between the first and second optical signals to be a desired frequency. The frequency difference between the first and second optical signals may be set to a pre-designated threshold value or smaller. The threshold value may be set on the basis of a bandwidth of the optical receiver 10 in FIG. 1.

The polarization adjustor 214 adjusts polarization of the first optical signal provided from the first light source 211. The polarization adjustor 214 may adjust polarization of the first optical signal so as to be the same as a polarization state of the reference signal. The polarization adjustor 214 outputs the adjusted first optical signal as the optical signal.

The above described light generating unit 210 outputs an optical signal and a reference signal having a constant frequency difference from the optical signal. An ideal shape of a Lissajous figure is determined on the basis of the frequency difference, the Lissajous figure being created by using I and Q signals output from the optical receiver 10 in FIG. 1 in response to the optical and reference signals output from the light generating unit 210.

When the created Lissajous figure is analyzed by using an elliptic equation, the magnitudes of I and Q components, and a phase difference between the I and Q components can be calculated. IQ imbalance for the optical receiver 10 in FIG. 1 may be calculated by using the calculated information.

Figure 9:
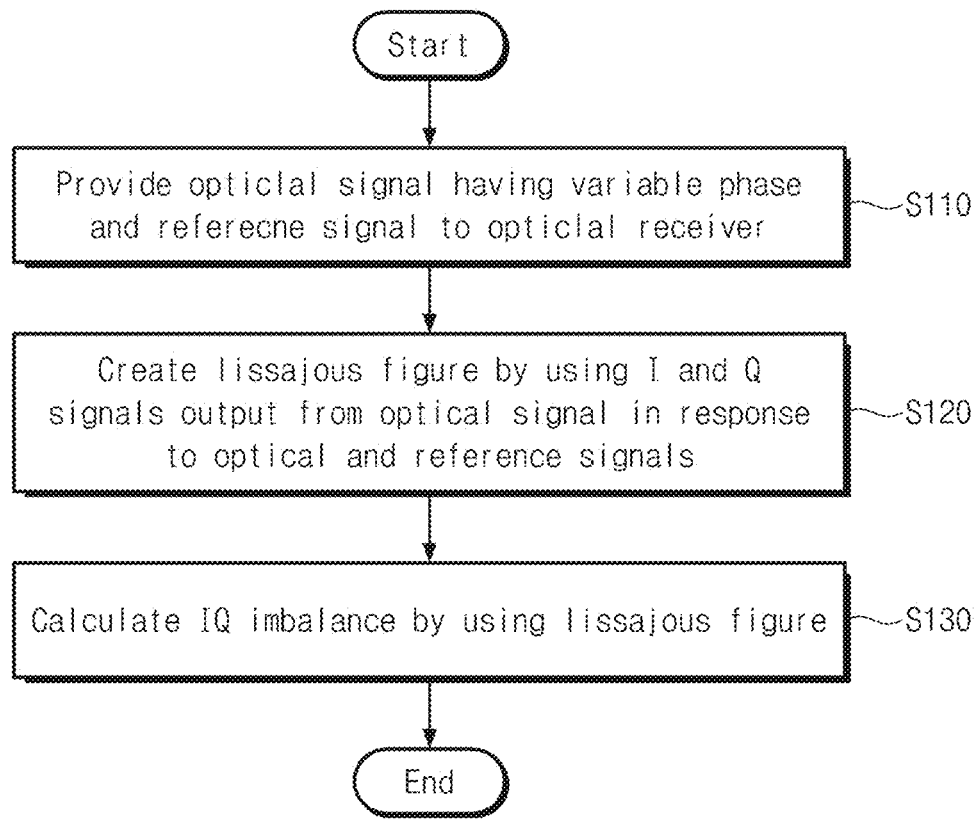
FIG. 9 is a flowchart illustrating a method of measuring IQ imbalance according to an embodiment of the present invention.

FIG. 9 is a flowchart illustrating a method of measuring IQ imbalance according to an embodiment of the present invention.

In operation S110, an optical signal having a variable phase and a reference signal are provided to an optical receiver for which IQ imbalance is desired to be measured. A phase of the optical signal may be varied in the range of 1 to $2\pi$. The optical receiver outputs I and Q signals in response to the provided optical and reference signals.

In operation 120, a Lissajous figure is created by using the I and Q signals output in operation S110. A horizontal axis of the Lissajous figure may denote the I signal and a vertical axis may denote the Q signal. When the I and Q signals have no IQ imbalance, an ideal Lissajous figure is a circle.

In operation S130, the IQ imbalance is calculated by using the Lissajous figure created in operation S120. When the Lissajous figure created in operation S120 is an ellipse, the magnitudes of I and Q components of the optical signal, and a phase difference between the I and Q components may be calculated by using the elliptic equation. The IQ imbalance for the optical receiver may be calculated by using the calculated information.

Figure 10:
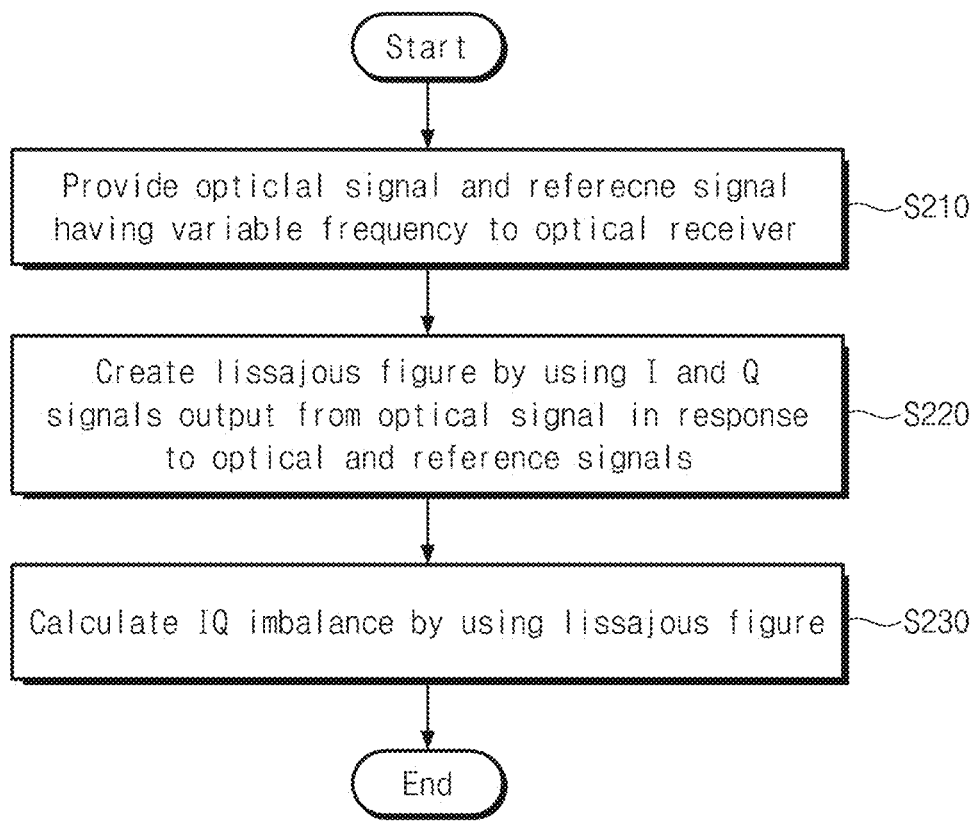
FIG. 10 is a flowchart illustrating a method of measuring IQ imbalance according to another embodiment of the present invention.

FIG. 10 is a flowchart illustrating a method of measuring IQ imbalance according to anther embodiment of the present invention.

In operation 210, an optical signal and a reference signal having a variable frequency are provided to an optical receiver for which IQ imbalance is measured is desired to be measured. The frequency of the reference signal may be adjusted to have a constant frequency difference from that of the optical signal. The frequency difference between the optical and reference signals may be set to have a pre-designated threshold value or smaller. The threshold value may be set on the basis of a bandwidth of the optical receiver. The optical receiver outputs I and Q signals in response to the optical reference signals provided to the optical receiver.

In operation S220, a Lissajous figure is created by using the I and Q signals output in operation S210. A horizontal axis of the Lissajous figure may denote the I signal and a vertical axis may denote the Q signal.

In operation S230, IQ imbalance for the optical receiver is calculated by using the Lissajous figure created in operation S220. By comparing the created Lissajous figure and the ideal Lissajous figure, magnitudes of I and Q components, and a phase difference between the I and Q components can be calculated. The IQ imbalance for the optical receiver can be calculated by using the calculated information.

According to an apparatus and method for measuring IQ imbalance of the present invention, IQ imbalance for an optical receiver can be measured with a few calculations for a low speed signal.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus for measuring IQ imbalance, the apparatus comprising:
    a light generating unit generating optical and reference signals to provide the optical and reference signals to an optical receiver;
    a graph creating unit creating a Lissajous figure by using an in-phase (I) signal and a quadrature-phase (Q) signal output from the optical receiver in response to the optical and reference signals; and
    a calculating unit calculating IQ imbalance for the optical receiver referring to the Lissajous figure,
    wherein the light generating unit comprises:
    a light source generating a reference optical signal;
    an optical splitter splitting the reference optical signal into first and second optical signals and outputting the second optical signal as the reference signal;
    an optical phase modulator modulating a phase of the first optical signal in response to a control voltage, and outputting the modulated first optical signal as the optical signal; and
    a function generator controlling the optical phase modulator by using the control voltage.

2. The apparatus of claim 1, wherein the optical and reference signals have the same frequency.

3. The apparatus of claim 2, wherein a phase of the optical signal is variable.

4. The apparatus of claim 1, wherein the light generating unit further comprises a polarization adjustor adjusting polarization of the first optical signal so as to allow polarization states of the optical and reference signals to be the same.

5. The apparatus of claim 1, wherein the function generator controls the optical phase modulator to change a phase of the first optical signal by or larger than $2\pi$.

6. The apparatus of claim 5, wherein the control voltage is varied linearly from a ground voltage to a threshold phase voltage level.

7. The apparatus of claim 1, wherein the calculating unit calculates the IQ imbalance of the optical receiver refer to the Lissajous figure by using an elliptic equation.

8. The apparatus of claim 1, wherein a frequency of the reference signal is variable.

9. The apparatus of claim 8, wherein a frequency difference between the reference and optical signals has a value of a pre-designated threshold value or smaller.

10. The apparatus of claim 9, wherein the pre-designated threshold value is set on the basis of a bandwidth of the optical receiver.

11. The apparatus of claim 8, wherein the light generating unit comprises:
    a first light source generating the optical signal;
    a second light source generating the reference signal;
    a wavelength controller controlling the second light source to vary a frequency of the reference signal; and
    a polarization adjustor adjusting polarization of the optical signal so as to allow the same polarization states of the optical and reference signals to be the same.

12. A method of measuring IQ imbalance for an optical receiver, the method comprising:
    providing an optical signal having a variable phase and a reference signal to the optical receiver;
    creating a Lissajous figure on the basis of I and Q signals output from the optical receiver in response to the optical and reference signals; and
    calculating the IQ imbalance for the optical receiver by using a preset equation of a figure with reference to the Lissajous figure.

13. The method of claim 12, wherein the reference signal has the same frequency as the optical signal, and
    wherein the calculating of the IQ imbalance comprises calculating the IQ imbalance for the optical receiver by using an elliptic equation with reference to the Lissajous figure.

14. A method of measuring IQ imbalance for a coherent optical receiver, the method comprising:
    providing an optical signal and a reference signal having a variable frequency to the coherent optical receiver;
    creating a Lissajous figure on the basis of I and Q signals output from the coherent optical receiver in response to the optical and reference signals; and
    calculating IQ imbalance for the coherent optical receiver with reference to the Lissajous figure,
    wherein a frequency difference between the reference and optical signals has a value of a pre-designated threshold value or smaller.

* * * * *